United States Patent
Zhang et al.

(10) Patent No.: US 9,908,111 B2
(45) Date of Patent: Mar. 6, 2018

(54) MIXED MOLECULAR SIEVE CATALYST AND PREPARATION METHOD AND USE THEREOF

(71) Applicant: SHANGHAI BI KE CLEAN ENERGY TECHNOLOGY CO., LTD., Shanghai (CN)

(72) Inventors: Fan Zhang, Shanghai (CN); Yijun Wang, Shanghai (CN); Guo Rui, Shanghai (CN); Yongsheng Gan, Shanghai (CN); Xiaomang Zhang, Shanghai (CN)

(73) Assignee: SHANGHAI BI KE CLEAN ENERGY TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 14/781,558

(22) PCT Filed: Apr. 8, 2014

(86) PCT No.: PCT/CN2014/074882
§ 371 (c)(1),
(2) Date: Sep. 30, 2015

(87) PCT Pub. No.: WO2014/166372
PCT Pub. Date: Oct. 16, 2014

(65) Prior Publication Data
US 2016/0045902 A1    Feb. 18, 2016

(30) Foreign Application Priority Data
Apr. 10, 2013 (CN) .......................... 2013 1 0123469

(51) Int. Cl.
*B01J 29/06* (2006.01)
*B01J 29/80* (2006.01)
*C10G 3/00* (2006.01)
*B01J 37/00* (2006.01)
*B01J 29/40* (2006.01)
*B01J 29/08* (2006.01)

(52) U.S. Cl.
CPC .......... *B01J 29/80* (2013.01); *B01J 37/0018* (2013.01); *B01J 37/0045* (2013.01); *C10G 3/49* (2013.01); *B01J 29/084* (2013.01); *B01J 29/40* (2013.01); *B01J 2229/36* (2013.01); *B01J 2229/42* (2013.01); *C10G 2400/20* (2013.01); *Y02P 20/52* (2015.11)

(58) Field of Classification Search
CPC . B01J 29/80; B01J 29/40; B01J 29/084; B01J 2229/36; B01J 2229/42; B01J 2229/16; B01J 37/0018; B01J 37/0009; B01J 37/0045; C10G 2400/20
USPC ...................... 502/63, 64, 67, 68, 71, 77, 79
See application file for complete search history.

(56) References Cited

U.S. PATENT DOCUMENTS

| | | | | |
|---|---|---|---|---|
| 4,443,553 A * | 4/1984 | Chiang | ................. | B01J 29/084 502/64 |
| 4,476,239 A * | 10/1984 | Chiang | ................. | B01J 29/084 502/68 |
| 4,826,793 A * | 5/1989 | Velten | ................... | B01J 29/084 502/64 |
| 4,877,514 A * | 10/1989 | Hettinger | ............... | B01J 29/084 208/120.05 |
| 5,110,776 A * | 5/1992 | Chitnis | .................... | B01J 29/06 208/114 |
| 2011/0207984 A1 | 8/2011 | Almeida et al. | | |

FOREIGN PATENT DOCUMENTS

| CN | 1666818 A | 9/2005 |
|---|---|---|
| CN | 1915518 A | 2/2007 |
| CN | 102039167 A | 5/2011 |
| CN | 102372548 A | 3/2012 |
| CN | 102886275 A * | 1/2013 |

OTHER PUBLICATIONS

CN102886275 English Machine Translation Obtained from Espacenet, 2016, pp. 1-14.*
International Search Report and Written Opinion and translation for PCT/CN2014/074882, dated Jul. 1, 2014, 7 pages.
First Office Action for CN201310123469.X, dated Oct. 28, 2015, 8 pages.

* cited by examiner

*Primary Examiner* — Elizabeth Wood
(74) *Attorney, Agent, or Firm* — Hovey Williams LLP

(57) ABSTRACT

The invention provides a mixed molecular sieve catalyst, comprising 5-30 wt % Y molecular sieve, 5-30 wt % ZSM-5 molecular sieve and the balance of matrix component and binder component. The invention further provides a method of preparing the mixed molecular sieve catalyst, comprising the following steps: mixing the Y molecular sieve, the ZSM-5 molecular sieve with a matrix material, a binder precursor, a pore former, a dispersant and water to formulate an aqueous slurry; spray drying the slurry; and baking. The invention further provides a method of preparing olefins from methanol with the use of the catalyst. By use of the catalyst of the invention, the selectivity to $C_3$ and $C_4$ olefins is improved significantly.

14 Claims, No Drawings

MIXED MOLECULAR SIEVE CATALYST AND PREPARATION METHOD AND USE THEREOF

RELATED APPLICATION

The present application is a national stage application under 35 U.S.C. § 371 of International Application No. PCT/CN2014/074882, filed Apr. 8, 2014, which is incorporated by reference herein in its entirety.

TECHNICAL FIELD

The invention relates to the technical field of heterogeneous catalysis in chemical industry, particularly to a mixed molecular sieve catalyst having high selectivity to propylene and $C_4$ olefin, and a preparation method and use of the same.

BACKGROUND ART

Propylene and butene are critically important chemical raw materials, and the global industrial demand for these two olefins is enormous. Along with the rapid development of downstream products, the gap between supply and demand widens year by year, and their prices have been rising uninterruptedly, far higher than the price of ethylene. Nowadays, propylene and butene mainly come from steam cracking and catalytic cracking of oil. However, as the oil supply tends to be increasingly short, the costs of these two olefin products increase year after year, and their outputs can hardly be guaranteed. Hence, there exists an urgent desire for development of a new process which uses a substitute raw material (e.g. an industrial raw material derived from coal or natural gas) and replaces the old process in which oil is used as the raw material. It is also desired to gain great progress with respect to cost and yield, etc.

Owing to the large-scale development of natural gas and coal chemical industry, as well as the scale-up of the equipment for methanol production, methanol becomes the most promising non-oil resource. As a result, the industrial utilization of methanol becomes a common focus of both academia and industry. As a new process with high additional value which may replace the old process using oil resources, the preparation of olefins from methanol has tremendous market value and application prospect.

A lot of research work has been done previously in this area. However, no satisfactory research results have been obtained to date. For example, Patent CN1166478 describes a method of preparing low carbon olefins such as ethylene and propylene from methanol or dimethyl ether, wherein the catalyst used is a SAPO-34 molecular sieve catalyst, the reaction is conducted in a dense-phase bed circulating fluidized reactor, and ethylene and propylene are the main olefin products at a reaction temperature of 500-570° C., a reaction pressure of 0.01-0.05 MPa and a space velocity of 2-6 $h^{-1}$. Because the price of ethylene is low, the additional value of the whole process is rather low. Additionally, the high reaction temperature in this process deactivates the catalyst rapidly, and thus the catalyst needs to be replaced or regenerated frequently, leading to linear increase in operating cost.

Therefore, it will be desirable to develop a new process for preparing olefins by using methanol as a raw material, which process has high selectivity to propylene and $C_4$ olefin, and decreased selectivity to ethylene and $C_6$ or higher olefins having low additional value.

SUMMARY

In order to solve the above problems existing in the prior art, the invention provides a mixed molecular sieve catalyst comprising a Y molecular sieve and a ZSM-5 molecular sieve. When the catalyst of the invention is used in the reaction for preparing olefins from methanol, high selectivity to propylene and $C_4$ olefin is obtained.

In a first aspect, the invention provides a mixed molecular sieve catalyst, comprising 5-30 wt % Y molecular sieve, 5-30 wt % ZSM-5 molecular sieve and the balance of matrix and binder components based on the total weight of the catalyst, wherein the particle diameter of the catalyst is 50-110 μm.

In a second aspect, the invention provides a method of preparing the mixed molecular sieve catalyst, comprising the following steps: (1) mixing the Y molecular sieve, the ZSM-5 molecular sieve with a matrix material, a binder precursor, a pore former, a dispersant and water to formulate an aqueous slurry; (2) spray drying the slurry prepared in step (1) to obtain dry particles; and (3) baking the dry particles prepared in step (2) to obtain the mixed molecular sieve catalyst.

In a preferred embodiment, the mixing weight ratio of the Y molecular sieve to the ZSM-5 molecular sieve is 0.1:1 to 5:1, preferably 0.2:1 to 3:1. In another preferred embodiment, the silica/alumina ratio of the Y molecular sieve is 2-25, preferably 10-20. In another preferred embodiment, the silica/alumina ratio of the ZSM-5 molecular sieve is 50-800, preferably 150-500.

In a preferred embodiment, prior to step (1), the Y molecular sieve is pretreated with steam at high temperature in advance, wherein the treatment temperature is 400-1000° C., preferably 500-800° C., and the treatment time is 1-20 hours, preferably 4-10 hours.

In an embodiment of the invention, the matrix material is selected from one or more of the group consisting of kaolin clay, calcined kaolin clay, diatomite, pseudo boehmite, and montmorillonite; the binder precursor is selected from one or more of the group consisting of alkaline silica sol, acidic silica sol, alumina sol, and aluminum phosphate; the pore former is selected from one or more of the group consisting of soluble starch, sesbania powder, polyvinyl alcohol, and methyl cellulose; and the dispersant is selected from one or more of the group consisting of n-octanol, ammonium bicarbonate, and hydrazine bicarbonate.

In an embodiment of the invention, based on the total weight of the aqueous slurry, the aqueous slurry has a solid content of 30-90 wt %, preferably 50-80 wt %; based on the total weight of the solid components in the aqueous slurry, the total weight of the Y molecular sieve and the ZSM-5 molecular sieve is 20-55 wt %, the content of the matrix material is 20-59 wt %, the content of the binder precursor is 20-50 wt %, the content of the pore former is 0.01-1 wt %, and the content of the dispersant is 0.01-1 wt %.

In an embodiment of the invention, in step (2), the spray drying is conducted using a centrifugal spray dryer or a pressure spray dryer, wherein the inlet temperature of the spray dryer is 250-300° C., the outlet temperature of the sprayer dryer is 150-200° C., and the feed rate of the slurry into the spray dryer is 100-500 ml/min; and in step (3), the baking is conducted in an air or nitrogen atmosphere at 400-600° C., preferably 450-550° C. for 3-6 hours, preferably 4-5 hours.

In a third aspect, the invention provides a method of preparing olefins by using methanol as the raw material, comprising the following step: contacting the mixed molecular sieve catalyst of the invention with a reaction raw material under reaction conditions in a fluidized bed reactor to produce olefin products, wherein the reaction raw material is a mixture of methanol vapor and water vapor, and the reaction conditions are as follows: the reaction temperature is 420-520° C., the pressure is 0.01-1.0 MPa, the space velocity of the methanol vapor in the reaction raw material is 0.1-10 $h^{-1}$, and the mass ratio of the methanol vapor to the water vapor in the reaction raw material is 0.1-10.

The invention will be further illustrated with reference to the Examples.

DETAILED DESCRIPTION OF THE INVENTION

A "range" disclosed herein comprises a lower limit and/or an upper limit. It may comprise one or more lower limits and/or one or more upper limits. A given range is defined by selecting one lower limit and one upper limit. The selected lower limit and upper limit define the boundary of a particular range. All ranges that may be defined this way are inclusive and combinable, i.e. any lower limit may be combined with any upper limit to form a new range. For example, when ranges of 60-120 and 80-110 are given for a particular parameter, it shall be understood that ranges of 60-110 and 80-120 are also contemplated. In addition, if 1 and 2 are given for the smallest ranges, and 3, 4 and 5 are given for the largest ranges, the following ranges are all contemplated: 1-3, 1-4, 1-5, 2-3, 2-4 and 2-5.

In the invention, a numerical range of "a-b" is a simplified representation of any real number combination between a and b, wherein both a and b are real numbers, unless otherwise specified. For example, the numerical range of "0-5" is intended to mean that all real numbers between "0-5" are disclosed herein, wherein "0-5" is only a simplified representation of these numeral combinations.

If not specified particularly, the term "two" as used herein refers to "at least two".

In the invention, if not specified particularly, all the embodiments and preferred embodiments mentioned herein may be combined with each other to form new technical solutions.

In the invention, if not specified particularly, all the technical features and preferred features mentioned herein may be combined with each other to form new technical solutions.

In the invention, if not specified particularly, all the steps mentioned herein may be conducted in order or randomly, but preferably in order. For example, when a method comprises steps (a) and (b), it means that this method comprises steps (a) and (b) conducted sequentially, or steps (b) and (a) conducted sequentially. For example, if the method mentioned above further comprises step (c), it means that step (c) may be incorporated into the method in any sequence. For example, the method may comprise steps (a), (b) and (c), or steps (a), (c) and (b), or steps (c), (a) and (b), etc.

In the invention, if not specified particularly, the term "comprise" mentioned herein is open or close ended. For example, the term "comprise" means that other elements which are not listed can also be included, or that only those elements which are listed are exclusively included.

The method of preparing a mixed molecular sieve catalyst according to the invention comprises the following specific steps:

(1) mixing a Y molecular sieve, a ZSM-5 molecular sieve with a matrix material, a binder precursor, a pore former, a dispersant and water to formulate an aqueous slurry;

(2) spray drying the aqueous slurry prepared in step (1) to obtain dry particles; and (3) baking the dry particles prepared in step (2) to obtain the mixed molecular sieve catalyst.

In step (1), the Y molecular sieve and the ZSM-5 molecular sieve are mixed at a mixing ratio by weight of from 0.1:1 to 5:1, preferably from 0.2:1 to 3:1.

Y molecular sieve represents a type of molecular sieve material known in the art, and comprises a truncated octahedral cage (β cage) as a structural unit which arranges in the form of a diamond structure in a three dimensional space to form a molecular sieve crystalline structure, wherein the β cages are linked through six-member rings via Si(Al)—O—Si(Al) bond into an octahedral molecular sieve cage (super cage). The octahedral molecular sieve cages communicate with each other through-twelve member rings in three crystal axis directions to form crystal cells. Y molecular sieve has three dimensional channels which facilitate diffusion of large molecules in the molecular sieve channels and reaction at acid sites. In a preferred embodiment of the invention, the Y molecular sieve used has a silica/alumina ratio of 2-25, preferably 10-20. For example, the silica/alumina ratio may be 10, 13, 15, 18, 20. It should be noted that the silica/alumina ratio of the Y molecular sieve and the ZSM-5 molecular sieve refers to the molar ratio of $SiO_2$ to $Al_2O_3$ in the molecular sieve skeleton.

ZSM-5 is a type of molecular sieve material widely used in the catalysis field. It was developed by Mobil Co., USA in 1970s. Its crystalline structure comprises silicon (aluminum)-oxygen tetrahedrons which form five-member silicon (aluminum) rings via oxygen bridges at the common vertices. Eight of such five-member rings form a basic structural unit of ZSM-5. The channel structure of ZSM-5 consists of straight channels having an elliptical cross section and Z channels having a suborbicular cross section which intersect with each other. In a preferred embodiment, the silica/alumina ratio of the ZSM-5 molecular sieve is 50-800, preferably 150-500. For example, the silica/alumina ratio can be 200, 250, 350, 400, or 450.

The total solid content of the aqueous slurry prepared in step (1) is 20-50 wt %, preferably 30-40 wt %. Based on the total weight of the solid components in the aqueous slurry, the total weight of the Y molecular sieve and the ZSM-5 molecular sieve is 20-55 wt %, the content of the matrix material is 20-59 wt %, the content of the binder precursor is 20-50 wt %, the content of the pore former is 0.01-1 wt %, and the content of the dispersant is 0.01-1 wt %.

The matrix material is selected from one or more of the group consisting of kaolin clay, calcined kaolin clay, diatomite, pseudo boehmite, and montmorillonite. Based on the total weight of the solid components in the aqueous slurry, the content of the matrix material is 20-59 wt %, and its particle diameter is less than 2 microns. The matrix material functions to improve the strength and abrasion resistance of the catalyst. In the course of baking, the matrix material may be dehydrated and/or decomposed to certain extent. For example, pseudo boehmite may be dehydrated during baking and form alumina. It is also possible that a portion of the matrix material is not dehydrated and/or decomposed. In the invention, all these components in the product catalyst are collectively termed as "the component derived from the matrix material", or "matrix component" in brief.

The binder precursor is selected from one or more of the group consisting of alkaline silica sol, acidic silica sol, alumina sol, aluminum phosphate. Based on the total weight of the solid components in the aqueous slurry, the content of the binder precursor is 20-50 wt %. The binder can improve the homogeneity and fluid behavior of the slurry system at the stage of slurry, and facilitate improvement in the whole mechanical strength of the catalyst obtained finally and significant improvement in its abrasion resistance. The alkaline silica sol refers to a sol formed from silicon dioxide particles in water, wherein the silicon dioxide has an average particle diameter of 20-40 nm. The pH of the alkaline silica sol is 9-10, wherein the molecular formula of the silicon dioxide is $SiO_2 \cdot nH_2O$. Based on the total weight of the silica sol, the silica sol, when calculated in the form of oxides, comprises 15-40 wt % silicon dioxide, 0.2-0.4 wt % $Na_2O$, and the balance of water. The alkaline silica sol has a viscosity (25° C.) of 2-2.5 MPa·s and a density (25° C.) of 1.1-1.3 g/cm³. Acidic silica sol is also called hydrosol of silicic acid. It is an acidic colloid formed from high molecular silicon dioxide particles dispersed in water. Its pH value is 2-4. Based on the total weight of the acidic silica sol, the silica sol, when calculated in the form of oxides, comprises 30-31 wt % silicon dioxide, less than 0.006 wt % $Na_2O$, and the balance of water. The acidic silica sol has a viscosity (25° C.) of less than 6 MPa·s and a density (25° C.) of 1.19-1.21 g/cm³. The average particle diameter of the silicon dioxide particles is 5-40 nm. The acidic silica sol may stand stably under ambient conditions for three months without formation of any precipitate. Alumina sol is a colloid formed from aluminum oxide particles in water, wherein the solid content is 10-40 wt %, pH is 1-3, the average particle diameter of the aluminum oxide particles is 10-50 nm, and the chemical formula of the aluminum oxide particles may be written as $Al_2O_3 \cdot nH_2O$. It should be noted that, when the binder precursor is silica sol, alumina sol and other water containing material, the content of the binder precursor mentioned above refers to the ratio of the weight of the solid components in the binder precursor with water or other solvent excluded to the total weight of the solid components in the aqueous slurry. When the solid content of the water containing material such as silica sol and alumina sol is known, one skilled in the art may obtain the weight of the binder precursor used by direct calculation according to the above principle with respect to the content. The binder precursor will be dehydrated and decomposed in the step of baking and form silica, alumina and like components in the end. In the invention, all these components in the product catalyst are collectively termed "the component derived from the binder precursor", or "binder component" in brief.

The pore former is a material that can be burned off completely during baking and thus leaving pores of desired size in the catalyst. The pore former is mainly used to form pores in the catalyst, and thus increase the contact area between the catalyst and the reactant materials. Pore forming materials known in the art may be used, and soluble starch, sesbania powder, polyvinyl alcohol and methyl cellulose are preferred for use. The pore former is used in a small amount to avoid influence on the catalytic performance of the catalyst and prevent incomplete burning of the pore former during baking. Based on the total weight of the solid components in the aqueous slurry, the content of the pore former is 0.01-1 wt %.

In order to promote sufficiently homogeneous dispersion of the various raw materials in the aqueous slurry, a small amount of a dispersant is added additionally. Any dispersant material known in the art may be used, and n-octanol, ammonium bicarbonate, hydrazine bicarbonate are preferred. These dispersants will also be removed during baking due to complete decomposition. Based on the total weight of the solid components in the aqueous slurry, the content of the dispersant is 0.01-1 wt %.

In step (2), a spray dryer is used to spray dry the aqueous slurry obtained in step (1). Any spray dryer known in the art may be used to conduct the spray drying operation, but a centrifugal spray dryer or a pressure spray dryer is preferred for use. These two types of spray dryers differ in the manner in which the slurry is atomized. In the centrifugal spray dryer, the slurry is delivered to a centrifugal turntable rotating at high speed in an atomizer, so that the slurry is thrown off at high speed and thus atomized. The pressure spray dryer uses a high pressure pump to jet the slurry into a drying chamber to atomize it.

The atomized slurry drops contact hot air, and thus the water in the slurry drops is gasified quickly, so as to obtain dry particles having substantially homogeneous particle size and shape.

Subsequently, the dry particles obtained in step (2) are baked in a heating furnace, and a mixed molecular sieve catalyst according to the invention is obtained in the end. As seen from the description of the above steps, after baking, the pore former and the dispersant are removed completely, and the resulting mixed molecular sieve catalyst product comprises the Y molecular sieve and the ZSM-5 molecular sieve as the active components, and the remnant solid components originated from the matrix material and the binder precursor. The ratio of the Y molecular sieve to the ZSM-5 molecular sieve in the catalyst substantially depends on the amounts of the raw materials used in the preparation of the aqueous slurry, and the composition of the remnant solid components depends on the specific amount and composition of the matrix material and the binder precursor used. In a preferred embodiment of the invention, based on the total amount of the mixed molecular sieve catalyst, the content of the Y molecular sieve is 5-30 wt %, and the content of the ZSM-5 molecular sieve is 5-30 wt %.

In order to further improve the performance of the mixed molecular sieve catalyst, the inventors also subject the Y molecular sieve raw material to a high temperature steam treatment beforehand. The high temperature steam treatment may be carried out as follows: contacting steam containing air with the Y molecular sieve for a period of time, wherein the temperature of the steam containing air may be 200-800° C., preferably 400-750° C.; the pressure may be 0.1-10 atm, preferably 0.8-5 atm, more preferably 0.9-1.5 atm; and the partial pressure of the steam in the steam containing air may be 20-80% of the total pressure. By way of this high temperature steam treatment, aluminum may be removed from the skeleton of the Y molecular sieve to decrease the acid density of the molecular sieve, so that side reactions are reduced and the life of the catalyst is thus prolonged.

The catalyst prepared according to the invention may be used for preparation of olefins from methanol, and the selectivity to propylene and $C_4$ olefin among the resulting olefin products is high. As used herein, $C_4$ olefin refers to any olefin containing four carbons, such as 1-butene, 2-butene, isobutene, 1,3-butadiene, etc. $C_6$ or higher olefins refer to various olefins containing six or more carbons.

The preferred embodiments of the invention will be illustrated more specifically with reference to the following specific Examples, but the protection scope of the invention is not limited thereto. Without departing from the protection scope defined by the claims of the invention, various modifications or combinations may be made to the preferred embodiments of the invention to obtain other embodiments of the invention which can still achieve similar technical effects.

EXAMPLES

In the following Examples, unless other specified, the water used is deionized water, and the chemical agents are analytically pure. The alkaline silica sol is a silica sol having a solid content of 30 wt % and pH of 9, and the average particle diameter of the solid particles is 14 nm. The acidic silica sol is a silica sol having a solid content of 30 wt % and pH of 2, and the average particle diameter of the solid particles is 14 nm. The alumina sol is an alumina sol having a solid content of 30 wt % and pH of 2, and the average particle diameter of the solid particles is 20 nm.

Example 1

First, in a fixed bed system, a mixture of steam and air (the partial pressure of the steam was 70% of the total gas pressure) having a temperature of 700° C. was allowed to pass over a Y molecular sieve having a silica/alumina ratio of 10 at a flow rate of 200 ml/min, and the treatment time was 6 hours. After cooled to room temperature, the Y molecular sieve was mixed with a ZSM-5 molecular sieve having a silica/alumina ratio of 350 at a weight ratio of 0.5:1. 600 g of the mixture of the Y molecular sieve and the ZSM-5 molecular sieve was agitated fully together with 600 g of kaolin clay, 400 g of pseudo boehmite, 1200 g of the alkaline silica sol, 2 g of sesbania powder, 1 g of n-octanol, 4000 g of deionized water in a 5 L stainless reactor to form an aqueous slurry. Subsequently, a centrifugal spray dryer was used to spray dry the slurry, wherein the inlet temperature of the spray dryer was 300° C., the outlet temperature was 180° C., and the feed rate of the slurry into the spray dryer was 100 ml/min. The dry particles prepared by the above spray drying were baked in an air atmosphere at 650° C. for 2 hours to obtain a mixed molecular sieve catalyst in a particulate shape having a particle size of 80 microns. As calculated from the fractions of the components in the raw materials that could not be burned off under the baking conditions, the content of the Y molecular sieve in the catalyst was 11 wt %, and the content of the ZSM-5 molecular sieve was 22 wt %.

Example 2

First, in a fixed bed system, a mixture of steam and air (the partial pressure of the steam was 40% of the total gas pressure) having a temperature of 650° C. was allowed to pass over a Y molecular sieve having a silica/alumina ratio of 13 at a flow rate of 300 ml/min, and the treatment time was 6 hours. After cooled to room temperature, the Y molecular sieve was mixed with a ZSM-5 molecular sieve having a silica/alumina ratio of 400 at a weight ratio of 1:1. 800 g of the mixture of the Y molecular sieve and the ZSM-5 molecular sieve was agitated fully together with 1200 g of kaolin clay, 900 g of pseudo boehmite, 750 g of the acidic silica sol, 10 g of sesbania powder, 35 g of n-octanol, 4000 g of deionized water in a 5 L stainless reactor to form an aqueous slurry. Subsequently, a centrifugal spray dryer was used to spray dry the slurry, wherein the inlet temperature of the spray dryer was 300° C., the outlet temperature was 180° C., and the feed rate of the slurry into the spray dryer was 250 ml/min. The dry particles prepared by the above spray drying were baked in an air atmosphere at 600° C. for 4 hours to obtain a mixed molecular sieve catalyst in a particulate shape having a particle size of 75 microns. As calculated from the fractions of the components in the raw materials that could not be burned off under the baking conditions, the content of the Y molecular sieve in the catalyst was 14.1 wt %, and the content of the ZSM-5 molecular sieve was 14.1 wt %.

Example 3

First, in a fixed bed system, a mixture of steam and air (the partial pressure of the steam was 80% of the total gas pressure) having a temperature of 550° C. was allowed to pass over a Y molecular sieve having a silica/alumina ratio of 15 at a flow rate of 400 ml/min, and the treatment time was 8 hours. After cooled to room temperature, the Y molecular sieve was mixed with a ZSM-5 molecular sieve having a silica/alumina ratio of 200 at a weight ratio of 2:1. 700 g of the mixture of the Y molecular sieve and the ZSM-5 molecular sieve was agitated fully together with 1400 g of diatomite, 900 g of the alumina sol, 100 g of the acidic silica sol, 30 g of sesbania powder, 10 g of n-octanol, 5000 g of deionized water in a 5 L stainless reactor to form an aqueous slurry. Subsequently, a pressure spray dryer was used to spray dry the slurry, wherein the inlet temperature of the spray dryer was 250° C., the outlet temperature was 180° C., and the feed rate of the slurry into the spray dryer was 275 ml/min. The dry particles prepared by the above spray drying were baked at 500° C. for 6 hours to obtain a mixed molecular sieve catalyst in a particulate shape having a particle size of 50 microns. As calculated from the fractions of the components in the raw materials that could not be burned off under the baking conditions, the content of the Y molecular sieve in the catalyst was 19.8 wt %, and the content of the ZSM-5 molecular sieve was 9.9 wt %.

Example 4

First, in a fixed bed system, a mixture of steam and air (the partial pressure of the steam was 50% of the total gas pressure) having a temperature of 600° C. was allowed to pass over a Y molecular sieve having a silica/alumina ratio of 18 at a flow rate of 150 ml/min, and the treatment time was 4 hours. After cooled to room temperature, the Y molecular sieve was mixed with a ZSM-5 molecular sieve having a silica/alumina ratio of 450 at a weight ratio of 0.8:1. 900 g of the mixture of the Y molecular sieve and the ZSM-5 molecular sieve was agitated fully together with 600 g of silica sol, 800 g of montmorillonite, 5 g of sesbania powder, 5 g of hydrazine bicarbonate, 12000 g of deionized water in a 5 L stainless reactor to form an aqueous slurry. Subsequently, a centrifugal spray dryer was used to spray dry the slurry, wherein the inlet temperature of the spray dryer was 300° C., the outlet temperature was 200° C., and the feed rate of the slurry into the spray dryer was 250 ml/min. The dry particles prepared by the above spray drying were baked at 600° C. for 4 hours to obtain a mixed molecular sieve catalyst in a particulate shape having a particle size of 80 microns. As calculated from the fractions of the components in the raw materials that could not be burned off under the baking conditions, the content of the Y molecular sieve in the catalyst was 21.5 wt %, and the content of the ZSM-5 molecular sieve was 26.8 wt %.

Example 5

First, in a fixed bed system, a mixture of steam and air (the partial pressure of the steam was 60% of the total gas pressure) having a temperature of 500° C. was allowed to pass over a Y molecular sieve having a silica/alumina ratio of 20 at a flow rate of 350 ml/min, and the treatment time was 8 hours. After cooled to room temperature, the Y molecular sieve was mixed with a ZSM-5 molecular sieve having a silica/alumina ratio of 250 at a weight ratio of 1.5:1. 900 g of the mixture of the Y molecular sieve and the ZSM-5 molecular sieve was agitated fully together with 600 g of silica sol, 800 g of montmorillonite, 5 g of sesbania powder, 5 g of hydrazine bicarbonate, 12000 g of deionized water in a 5 L stainless reactor to form an aqueous slurry. Subsequently, a pressure spray dryer was used to spray dry the slurry, wherein the inlet temperature of the spray dryer was 300° C., the outlet temperature was 200° C., and the feed rate of the slurry into the spray dryer was 500 ml/min. The dry particles prepared by the above spray drying were baked at 550° C. for 6 hours to obtain a mixed molecular sieve catalyst in a particulate shape having a particle size of 80 microns. As calculated from the fractions of the components in the raw materials that could not be burned off under the baking conditions, the content of the Y molecular sieve in the catalyst was 29.0 wt %, and the content of the ZSM-5 molecular sieve was 19.3 wt %.

Example 6

First, in a fixed bed system, a mixture of steam and air (the partial pressure of the steam was 80% of the total gas pressure) having a temperature of 650° C. was allowed to pass over a Y molecular sieve having a silica/alumina ratio of 15 at a flow rate of 100 ml/min, and the treatment time was 6 hours. After cooled to room temperature, the Y molecular sieve was mixed with a ZSM-5 molecular sieve having a silica/alumina ratio of 350 at a weight ratio of 1:1. 700 g of the mixture of the Y molecular sieve and the ZSM-5 molecular sieve was agitated fully together with 1400 g of diatomite, 900 g of the alumina sol, 100 g of the acidic silica sol, 30 g of sesbania powder, 10 g of n-octanol, 5000 g of deionized water in a 5 L stainless reactor to form an aqueous slurry. Subsequently, a pressure spray dryer was used to spray dry the slurry, wherein the inlet temperature of the spray dryer was 300° C., the outlet temperature was 180° C., and the feed rate of the slurry into the spray dryer was 100 ml/min. The dry particles prepared by the above spray drying were baked at 650° C. for 2 hours to obtain a mixed molecular sieve catalyst in a particulate shape having a particle size of 70 microns. As calculated from the fractions of the components in the raw materials that could not be burned off under the baking conditions, the content of the Y molecular sieve in the catalyst was 14.4 wt %, and the content of the ZSM-5 molecular sieve was 14.4 wt %.

Example 7

First, in a fixed bed system, a mixture of steam and air (the partial pressure of the steam was 30% of the total gas pressure) having a temperature of 600° C. was allowed to pass over a Y molecular sieve having a silica/alumina ratio of 10 at a flow rate of 200 ml/min, and the treatment time was 10 hours. After cooled to room temperature, the Y molecular sieve was mixed with a ZSM-5 molecular sieve having a silica/alumina ratio of 200 at a weight ratio of 2.5:1. 600 g of the mixture of the Y molecular sieve and the ZSM-5 molecular sieve was agitated fully together with 600 g of kaolin clay, 400 g of pseudo boehmite, 1200 g of the alkaline silica sol, 2 g of sesbania powder, 1 g of n-octanol, 4000 g of deionized water in a 5 L stainless reactor to form an aqueous slurry. Subsequently, a pressure spray dryer was used to spray dry the slurry, wherein the inlet temperature of the spray dryer was 300° C., the outlet temperature was 200° C., and the feed rate of the slurry into the spray dryer was 250 ml/min. The dry particles prepared by the above spray drying were baked at 600° C. for 4 hours to obtain a mixed molecular sieve catalyst in a particulate shape having a particle size of 55 microns. As calculated from the fractions of the components in the raw materials that could not be burned off under the baking conditions, the content of the Y molecular sieve in the catalyst was 23.6 wt %, and the content of the ZSM-5 molecular sieve was 9.4 wt %.

Example 8

First, in a fixed bed system, a mixture of steam and air (the partial pressure of the steam was 50% of the total gas pressure) having a temperature of 600° C. was allowed to pass over a Y molecular sieve having a silica/alumina ratio of 15 at a flow rate of 150 ml/min, and the treatment time was 8 hours. After cooled to room temperature, the Y molecular sieve was mixed with a ZSM-5 molecular sieve having a silica/alumina ratio of 450 at a weight ratio of 1.2:1. 900 g of the mixture of the Y molecular sieve and the ZSM-5 molecular sieve was agitated fully together with 1400 g of diatomite, 900 g of the alumina sol, 100 g of the acidic silica sol, 30 g of sesbania powder, 10 g of n-octanol, 5000 g of deionized water in a 5 L stainless reactor to form an aqueous slurry. Subsequently, a pressure spray dryer was used to spray dry the slurry, wherein the inlet temperature of the spray dryer was 250° C., the outlet temperature was 180° C., and the feed rate of the slurry into the spray dryer was 265 ml/min. The dry particles prepared by the above spray drying were baked at 500° C. for 6 hours to obtain a mixed molecular sieve catalyst in a particulate shape having a particle size of 65 microns. As calculated from the fractions of the components in the raw materials that could not be burned off under the baking conditions, the content of the Y molecular sieve in the catalyst was 19.3 wt %, and the content of the ZSM-5 molecular sieve was 16.1 wt %.

Comparative Example 1

600 g of a ZSM-5 molecular sieve having a silica/alumina ratio of 400 was agitated fully together with 600 g of kaolin clay, 400 g of pseudo boehmite, 1200 g of the alkaline silica sol, 2 g of sesbania powder, 1 g of n-octanol, 4000 g of deionized water in a 5 L stainless reactor to form an aqueous slurry. Subsequently, a pressure spray dryer was used to spray dry the slurry, wherein the inlet temperature of the spray dryer was 300° C., the outlet temperature was 200° C., and the feed rate of the slurry into the spray dryer was 250 ml/min. The dry particles prepared by the above spray drying were baked at 600° C. for 4 hours to obtain a mixed molecular sieve catalyst in a particulate shape having a particle size of 80 microns. As calculated from the fractions of the components in the raw materials that could not be burned off under the baking conditions, the content of the ZSM-5 molecular sieve in the catalyst was 33.0 wt %.

Comparative Example 2

200 g of a mixture of a Y molecular sieve having a silica/alumina ratio of 10 and a ZSM-5 molecular sieve having a silica/alumina ratio of 400 was agitated fully together with 600 g of kaolin clay, 400 g of pseudo boehmite, 1200 g of the alkaline silica sol, 2 g of sesbania powder, 1 g of n-octanol, 4000 g of deionized water in a 5 L stainless reactor to form an aqueous slurry. Subsequently, a pressure spray dryer was used to spray dry the slurry, wherein the inlet temperature of the spray dryer was 300° C., the outlet temperature was 200° C., and the feed rate of the slurry into the spray dryer was 250 ml/min. The dry particles prepared by the above spray drying were baked at 600° C.

for 4 hours to obtain a mixed molecular sieve catalyst in a particulate shape having a particle size of 55 microns. As calculated from the fractions of the components in the raw materials that could not be burned off under the baking conditions, the content of the Y molecular sieve in the catalyst was 11.0 wt %, and the content of the ZSM-5 molecular sieve was 22.0 wt %.

Example 9: Characterization of the Catalytic Performance of the Catalysts 150 g of the catalyst in each of the above Examples 1-8 and Comparative Examples 1-2 was weighed and charged into a fluidized bed having a diameter of 50 mm and a height of 110 cm, wherein a mixture of methanol and water vapor was used as a raw material, and the reaction pressure was 0.1 MPa. Gas chromatography was used to detect the compositions of the products prepared in the reactions using these catalysts, and the selectivity of the various components in the products was calculated. The conversion of methanol was measured to be 100%. Table 1 below shows the reaction temperature, the space velocity of methanol, the weight ratio of methanol to water in the gaseous raw material, and the selectivity to propylene, $C_4$ olefin and $C_{6+}$ olefin in the products after 8 hour reaction, wherein the selectivity to a product is calculated on the basis of weight.

TABLE 1

Results of characterization of the performance of the catalysts

| | Reaction temperature/ °C. | Space velocity of methanol/h$^{-1}$ | Methanol water ratio | Propylene selectivity/ % | $C_4$ selectivity/ % | $C_6$ selectivity/ % |
|---|---|---|---|---|---|---|
| Example 1 | 470 | 1 | 3:1 | 44.1 | 25.4 | 8.3 |
| Example 2 | 480 | 1 | 1:1 | 45.1 | 26.1 | 7.7 |
| Example 3 | 460 | 1.2 | 1:1 | 43.7 | 24.1 | 6.3 |
| Example 4 | 500 | 0.75 | 0.5:1 | 42.9 | 27.2 | 9.0 |
| Example 5 | 480 | 5 | 2:1 | 42.2 | 26.0 | 6.8 |
| Example 6 | 450 | 2 | 2:1 | 45.7 | 26.1 | 7.0 |
| Example 7 | 450 | 1 | 1:1 | 43.4 | 27.5 | 5.8 |
| Example 8 | 490 | 1 | 2:1 | 44.8 | 26.4 | 7.9 |
| Comparative Example 1 | 470 | 1 | 1:1 | 39.2 | 22.7 | 20.2 |
| Comparative Example 2 | 470 | 1 | 1:1 | 39.4 | 22.8 | 19.8 |

As can be seen from the results in Table 1, in comparison with the catalyst only comprising a ZSM-5 molecular sieve, a synergistic effect is achieved by the use of a mixed system of two molecular sieves according to the invention, wherein the selectivity to propylene and $C_4$ olefin is improved significantly, and the content of $C_{6+}$ olefin in the product is decreased remarkably. In addition, as can be seen from the comparison between the experimental results of the inventive Examples with those of Comparative Example 2, the selectivity of the catalyst of the invention may be further improved by high temperature steam treatment of the Y molecular sieve in advance.

What is claimed is:

1. A method of preparing a mixed molecular sieve catalyst consisting of from 5 to 30 wt % Y molecular sieve, from 5 to 30 wt % ZSM-5 molecular sieve and the balance of matrix component and binder component based on the total weight of the catalyst, wherein the particle diameter of the catalyst is from 50 to 110 μm, said method consisting of the following steps:
  (1) mixing the Y molecular sieve, and the ZSM-5 molecular sieve with a matrix material, a binder precursor, a pore former, a dispersant and water to formulate an aqueous slurry;
  (2) spray drying the slurry prepared in step (1) to obtain dry particles; and
  (3) baking the dry particles prepared in step (2) to obtain the mixed molecular sieve catalyst;
  wherein the matrix material is selected from one or more of the group consisting of kaolin clay, calcined kaolin clay, diatomite, pseudo boehmite, and montmorillonite; the binder precursor is selected from one or more of the group consisting of basic silica sol, acidic silica sol, alumina sol, and aluminum phosphate; the pore forming agent is selected from one or more of the group consisting of soluble starch, sesbania powder, polyvinyl alcohol, and methyl cellulose; and the dispersant is selected from one or more of the group consisting of n-octanol, ammonium bicarbonate, and hydrazine bicarbonate.

2. The method of claim 1, wherein the mixing weight ratio of the Y molecular sieve to the ZSM-5 molecular sieve is from 0.1:1 to 5:1.

3. The method of claim 1, wherein the silica/alumina ratio of the Y molecular sieve is from 2 to 25.

4. The method of claim 1, wherein the silica/alumina ratio of the ZSM-5 molecular sieve is 50-800.

5. The method of claim 1, wherein, based on the total weight of the aqueous slurry, the aqueous slurry has a solid content of 30-90 wt % based on the total weight of the solid components in the aqueous slurry, the total weight of the Y molecular sieve and the ZSM-5 molecular sieve is 20-55 wt %, the content of the matrix material is 20-59 wt %, the content of the binder precursor is 20-50 wt %, the content of the pore former is 0.01-1 wt %, and the content of the dispersant is 0.01-1 wt %.

6. The method of claim 1, wherein, in step (2), the spray drying is conducted using a centrifugal spray dryer or a pressure spray dryer, wherein the inlet temperature of the spray dryer is 250-300° C., the outlet temperature thereof is 150-200° C., and the feed rate of the slurry into the spray dryer is 100-500 ml/min; and in step (3), the baking is conducted in an air or nitrogen atmosphere at a temperature of 400-600° C.

7. The method of claim 1, wherein the mixing weight ratio of the Y molecular sieve to the ZSM-5 molecular sieve is from 0.2:1 to 3:1.

8. The method of claim 1, wherein the silica/alumina ratio of the Y molecular sieve is from 10 to 20.

9. The method of claim 1, wherein the silica/alumina ratio of the ZSM-5 molecular sieve is 150-500.

10. The method of claim 1, wherein, based on the total weight of the aqueous slurry, the aqueous slurry has a solid content of 50-80 wt %; based on the total weight of the solid components in the aqueous slurry, the total weight of the Y molecular sieve and the ZSM-5 molecular sieve is 20-55 wt %, the content of the matrix material is 20-59 wt %, the content of the binder precursor is 20-50 wt %, the content of the pore former is 0.01-1 wt %, and the content of the dispersant is 0.01-1 wt %.

11. The method of claim 1, wherein, in step (2), the spray drying is conducted using a centrifugal spray dryer or a pressure spray dryer, wherein the inlet temperature of the spray dryer is 250-300° C., the outlet temperature thereof is 150-200° C., and the feed rate of the slurry into the spray dryer is 100-500 ml/min; and in step (3), the baking is conducted in an air or nitrogen atmosphere at a temperature of 450-550° C. for 4-5 hours.

12. A method of preparing a mixed molecular sieve catalyst consisting of from 5 to 30 wt % Y molecular sieve, from 5 to 30 wt % ZSM-5 molecular sieve and the balance of matrix component and binder component based on the total weight of the catalyst, wherein the particle diameter of the catalyst is from 50 to 110 μm, said method consisting of the following steps:
(1) pretreating the Y molecular sieve with steam at a treatment temperature of 400-1000° C. for a treatment time of 1-20 hours;
(2) mixing the pretreated Y molecular sieve prepared in step (1), and the ZSM-5 molecular sieve with a matrix material, a binder precursor, a pore former, a dispersant and water to formulate an aqueous slurry;
(3) spray drying the slurry prepared in step (2) to obtain dry particles; and
(4) baking the dry particles prepared in step (3) to obtain the mixed molecular sieve catalyst;
wherein the matrix material is selected from one or more of the group consisting of kaolin clay, calcined kaolin clay, diatomite, pseudo boehmite, and montmorillonite; the binder precursor is selected from one or more of the group consisting of basic silica sol, acidic silica sol, alumina sol, and aluminum phosphate; the pore forming agent is selected from one or more of the group consisting of soluble starch, sesbania powder, polyvinyl alcohol, and methyl cellulose; and the dispersant is selected from one or more of the group consisting of n-octanol, ammonium bicarbonate, and hydrazine bicarbonate.

13. A method of preparing a mixed molecular sieve catalyst consisting of from 5 to 30 wt % Y molecular sieve, from 5 to 30 wt % ZSM-5 molecular sieve and the balance of matrix component and binder component based on the total weight of the catalyst, wherein the particle diameter of the catalyst is from 50 to 110 μm, said method consisting of the following steps:
(1) pretreating the Y molecular sieve with steam at a treatment temperature of 500-800° C. for a treatment time of 4-10 hours;
(2) mixing the pretreated Y molecular sieve prepared in step (1), and the ZSM-5 molecular sieve with a matrix material, a binder precursor, a pore former, a dispersant and water to formulate an aqueous slurry;
(3) spray drying the slurry prepared in step (2) to obtain dry particles; and
(4) baking the dry particles prepared in step (3) to obtain the mixed molecular sieve catalyst;
wherein the matrix material is selected from one or more of the group consisting of kaolin clay, calcined kaolin clay, diatomite, pseudo boehmite, and montmorillonite; the binder precursor is selected from one or more of the group consisting of basic silica sol, acidic silica sol, alumina sol, and aluminum phosphate; the pore forming agent is selected from one or more of the group consisting of soluble starch, sesbania powder, polyvinyl alcohol, and methyl cellulose; and the dispersant is selected from one or more of the group consisting of n-octanol, ammonium bicarbonate, and hydrazine bicarbonate.

14. The method of claim 6, wherein in step (3), the baking is conducted at a temperature of 450-550° C. for 3-6 hours.

* * * * *